US012033680B1

(12) United States Patent
Yu et al.

(10) Patent No.: US 12,033,680 B1
(45) Date of Patent: Jul. 9, 2024

(54) METHOD FOR READING AND WRITING WITH HOLOGRAPHIC STORAGE SYSTEM AND HOLOGRAPHIC STORAGE SYSTEM

(71) Applicant: National Central University, Taoyuan (TW)

(72) Inventors: Yeh-Wei Yu, Taoyuan (TW); Ching-Cherng Sun, Taoyuan (TW); Yuan-Cheng Chen, Taichung (TW); Kun-Hao Huang, New Taipei (TW); Huai-Ming Kuan, Taoyuan (TW)

(73) Assignee: National Central University, Taoyuan (TW)

( * ) Notice: Subject to any disclaimer, the term of this patent is extended or adjusted under 35 U.S.C. 154(b) by 0 days.

(21) Appl. No.: 18/454,091

(22) Filed: Aug. 23, 2023

(30) Foreign Application Priority Data

Mar. 7, 2023 (TW) ................................. 112108340
Jul. 26, 2023 (TW) ................................. 112128049

(51) Int. Cl.
*G11B 7/0065* (2006.01)
*G11B 7/128* (2012.01)
*G11B 7/1353* (2012.01)

(52) U.S. Cl.
CPC ............ *G11B 7/0065* (2013.01); *G11B 7/128* (2013.01); *G11B 7/1353* (2013.01)

(58) Field of Classification Search
CPC ...... G11B 7/0065; G11B 7/128; G11B 7/1353
See application file for complete search history.

(56) References Cited

U.S. PATENT DOCUMENTS

| 5,377,176 A | 12/1994 | Redfield |
| 5,477,347 A | 12/1995 | Redfield |
(Continued)

FOREIGN PATENT DOCUMENTS

| CN | 100451873 C | 1/2009 |
| TW | I556231 B | 11/2016 |
| TW | I571869 B | 2/2017 |

OTHER PUBLICATIONS

Jinpeng Liu et al., "Phase modulated high density collinear holographic data storage system with phase-retrieval reference beam locking and orthogonal reference encoding," Optics Express, vol. 26, No. 4, Feb. 19, 2018, pp. 3828-3838.
(Continued)

*Primary Examiner* — Andrew Sasinowski
(74) *Attorney, Agent, or Firm* — CKC & Partners Co., LLC

(57) ABSTRACT

A method for reading and writing with holographic storage system includes (a) providing a reference light and a signal light; (b) transferring the reference light and the signal light to an optical storage medium to record an interference grating; (c) changing the reference light and the signal light and repeating the step of providing another changed reference light and another changed signal light to step (b), in which the reference light and the interference grating are one-to-one correspondence; (d) moving the optical storage medium and repeating steps (a) to (c); (e) providing a reading light which includes the reference lights to the optical storage medium to simultaneously read the interference gratings to form an interference result, any one of the reference lights cannot read out the interference gratings recorded by the other reference lights; and (f) moving the optical storage medium and repeating step (e).

17 Claims, 7 Drawing Sheets

(56) References Cited

U.S. PATENT DOCUMENTS

| | | | |
|---|---|---|---|
| 5,729,364 A | 3/1998 | Bashaw | |
| 11,100,950 B1 | 8/2021 | Yu et al. | |
| 2007/0041302 A1 | 2/2007 | Kuroda | |
| 2007/0253043 A1 | 11/2007 | Bates et al. | |
| 2011/0249544 A1* | 10/2011 | Sun | G11B 7/1378 |
| 2012/0287765 A1* | 11/2012 | Kawamura | G11B 7/0901 |
| 2013/0322224 A1* | 12/2013 | Yamazaki | G11B 7/0065 |
| | | | 369/103 |
| 2014/0301177 A1* | 10/2014 | Ishii | G11B 7/0065 |
| | | | 369/103 |
| 2015/0221331 A1* | 8/2015 | Onoe | G03H 1/182 |
| | | | 369/103 |
| 2016/0336034 A1* | 11/2016 | Imai | G11B 7/083 |
| 2018/0267464 A1 | 9/2018 | Minamiguchi | |

OTHER PUBLICATIONS

Masatoshi Bunsen et al., "Detection method for the complex amplitude of a signal beam with intensity and phase modulation using the transport of intensity equation for holographic data storage," Optics Express, vol. 27, No. 17, Aug. 19, 2019, pp. 24029-24042.

* cited by examiner

METHOD FOR READING AND WRITING WITH HOLOGRAPHIC STORAGE SYSTEM AND HOLOGRAPHIC STORAGE SYSTEM

RELATED APPLICATIONS

This application claims priority to Taiwan Application Serial Number 112108340, filed Mar. 7, 2023, and Taiwan Application Serial Number 112128049, filed Jul. 26, 2023, the disclosures of which are herein incorporated by reference in their entireties.

BACKGROUND

Field of Disclosure

The present disclosure relates to a method for reading and writing with holographic storage system and a holographic storage system.

Description of Related Art

A conventional holographic storage system generally uses a storage method based on unit pages, in which a position is stored with multiple pages of information. Each of the pages exists as an interference grating, and each page corresponds to a reference light. Although the density of information stored is much higher than the traditional method, due to the independence of the signal of each of the pages, when reading, only one page will be read out at a reading step. The signals of each of the pages will not interfere with each other, such that the efficiency of diffraction is sufficiently low. For example, for a holographic storage system multiplexing with 300 pages, since the electrical field diffracted is only one over three hundred of the original irradiated electric field, the efficiency of diffraction will be one over ninety thousand.

SUMMARY

One aspect of the present disclosure provides a method for reading and writing with holographic storage system.

According to one embodiment of the present disclosure, a method for reading and writing with holographic storage system includes the following steps: (a) providing a reference light and a signal light; (b) propagating the reference light and the signal light to an optical storage medium to record an interference grating; (c) changing the reference light and the signal light and repeating the step of providing another changed reference light and another changed signal light to step (b), in which the reference lights and the interference gratings are one-to-one correspondence; (d) and repeating steps (a) to (c) to obtain a plurality of the reference lights and a plurality of the interference gratings; (e) providing a reading light that includes the reference lights to the optical storage medium to simultaneously read the interference gratings to form an interference result, in which the interference result is the interference of a plurality of diffraction signals of the interference gratings respectively, any one of the reference lights cannot read out the interference gratings recorded by the other reference lights; and (f) moving the optical storage medium and repeating step (e) to obtain a plurality of the interference results and a plurality of the reading lights.

In some embodiments of the present disclosure, before repeating the steps (a) to (c), the optical storage medium is moved.

In some embodiments of the present disclosure, the interference results change along with moving of the optical storage medium.

In some embodiments of the present disclosure, phases or weighting factors of the diffraction signals when the diffraction signals interfere with each other is determined by phases or amplitudes of providing the signal lights.

In some embodiments of the present disclosure, a displacement between each of the signal lights and each of the reading lights is defined to be $\xi_s$, a reading-writing phase difference $\omega_j(\xi_s)$ is between each of the reading lights and one of the reference light, the reading-writing phase differences $\omega_j(\xi_s)$ defines a plurality of bases $e^{i\omega_j(\xi_s)}$, the bases are superimposed and adjust a weighting factor of the bases to obtain a distribution function $E(\xi_s)$, an absolute squared value of the distribution function $|E(\xi_s)|^2$ is measured by a photoelectric detector. The phases or weighting factors of the diffraction signals when interfering with each other are set according to the desired absolute squared value of the distribution function.

In some embodiments of the present disclosure, the reference lights and the signal lights are provided by a spatial light modulator, the spatial light modulator and the optical storage medium is an object-image relationship.

In some embodiments of the present disclosure, the reference lights are a plurality of cylindrical waves, the cylindrical waves are provided by the spatial light modulator, and a waveform of the cylindrical waves along a displacement vector of the optical storage medium is a spherical wave.

In some embodiments of the present disclosure, the displacement vector of the optical storage medium is along the Bragg-degeneracy direction of a wave vector of the interference grating.

In some embodiments of the present disclosure, a waveform of the reference lights along a direction perpendicular to a displacement vector of the optical storage medium is an inclined plane wave.

In some embodiments of the present disclosure, the method for reading and writing with holographic storage system further includes using the interference results $I_{r1,r2}^T(p)$ and a signal transformation matrix $H_{r1,r2}$ to calculate a modulation $S_{r1,r2}(j)$ of a spatial light modulator when using the spatial light modulator to modulate the $j^{th}$ interference grating of the M interference gratings under a specific spatial parameter. A calculation formula is indicated as below:

$$S_{r1,r2}(j) = H_{r1,r2} I_{r1,r2}^T(p)$$

The superscript "$T$" means matrix transpose, r1, r2 is a kind of two-dimension coordinate, which depends on the relationship between the input signal S and the output signal I. For example, if the relationship between the input signal S and the output signal I is an object-image relationship, r1, r2 is same as the spatial coordinate of S. If the relationship between the input signal S and the output signal I is a Fourier transform relationship, r1, r2 is same as the Fourier-transformed coordinate of S. A relationship between p and $\xi_s$ is indicated as the following: $\xi_s = p\Delta\xi_s$. $\Delta\xi_s$ is the displacement of the optical storage medium on the $\xi_s$ direction every time when reading.

In some embodiments of the present disclosure, when changing the reference light and the signal light and repeating the step of providing another changed reference light and another changed signal light to step (b) is performing, the optical storage medium remains static.

One aspect of the present disclosure provides a holographic storage system.

According to one embodiment of the present disclosure, a holographic storage system includes a spatial light modulator, an optical storage medium, an image sensor, a first lens group and a second lens group. The spatial light modulator is configured to modulate a plurality of reference lights and a plurality of signal lights. The optical storage medium is located at a side of the spatial light modulator, configured to store a plurality of interference gratings by the reference lights and the signal lights in a writing mode. The reference lights and the interference gratings are one-to-one correspondence, and any one of the reference lights cannot read out the interference gratings recorded by the other reference lights. The image sensor is located at a side of the optical storage medium facing away the spatial light modulator, configured to receive a plurality of interference results of the interference gratings in a reading mode. The first lens group is located between the spatial light modulator and the optical storage medium. The second lens group is located between the optical storage medium and the image sensor.

In some embodiments of the present disclosure, in the reading mode, a plurality of reference beam is used to read a plurality of the interference grating.

In some embodiments of the present disclosure, the first lens group includes at least two lenses, and the second lens group includes at least two lenses.

In some embodiments of the present disclosure, the holographic storage system further includes a first shielding plate and a second shielding plate. The first shielding plate is located between the two lenses of the first lens group, configured to filter the noise of the signal lights. The second shielding plate is located between the two lenses of the second lens group, configured to block a reading light penetrating the optical storage medium.

In some embodiments of the present disclosure, a relationship between the optical storage medium and the image sensor is an object-image relationship.

In some embodiments of the present disclosure, a relationship between the optical storage medium and the image sensor is a Fourier transform relationship.

In the aforementioned embodiments of the present disclosure, since when writing, each of the reference lights and the interference grating correspond to the reference light are one-to-one correspondence, any one of the reference lights cannot read out the interference gratings recorded by the other reference lights. Therefore, when reading, a reading light including multiple reference lights can be simultaneously irradiates, such that the diffraction signals of all the interference gratings can be read out at the same time and interfere with each other. Thereafter, the original information can be obtained through calculation and weighting. As a result, since the signals of every page interfere with each other, the efficiency of diffraction will significantly increase. For example, for a holographic storage system with 300 pages, since the signals of all 300 pages are read out, the efficiency of diffraction is 300 times of the conventional method.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
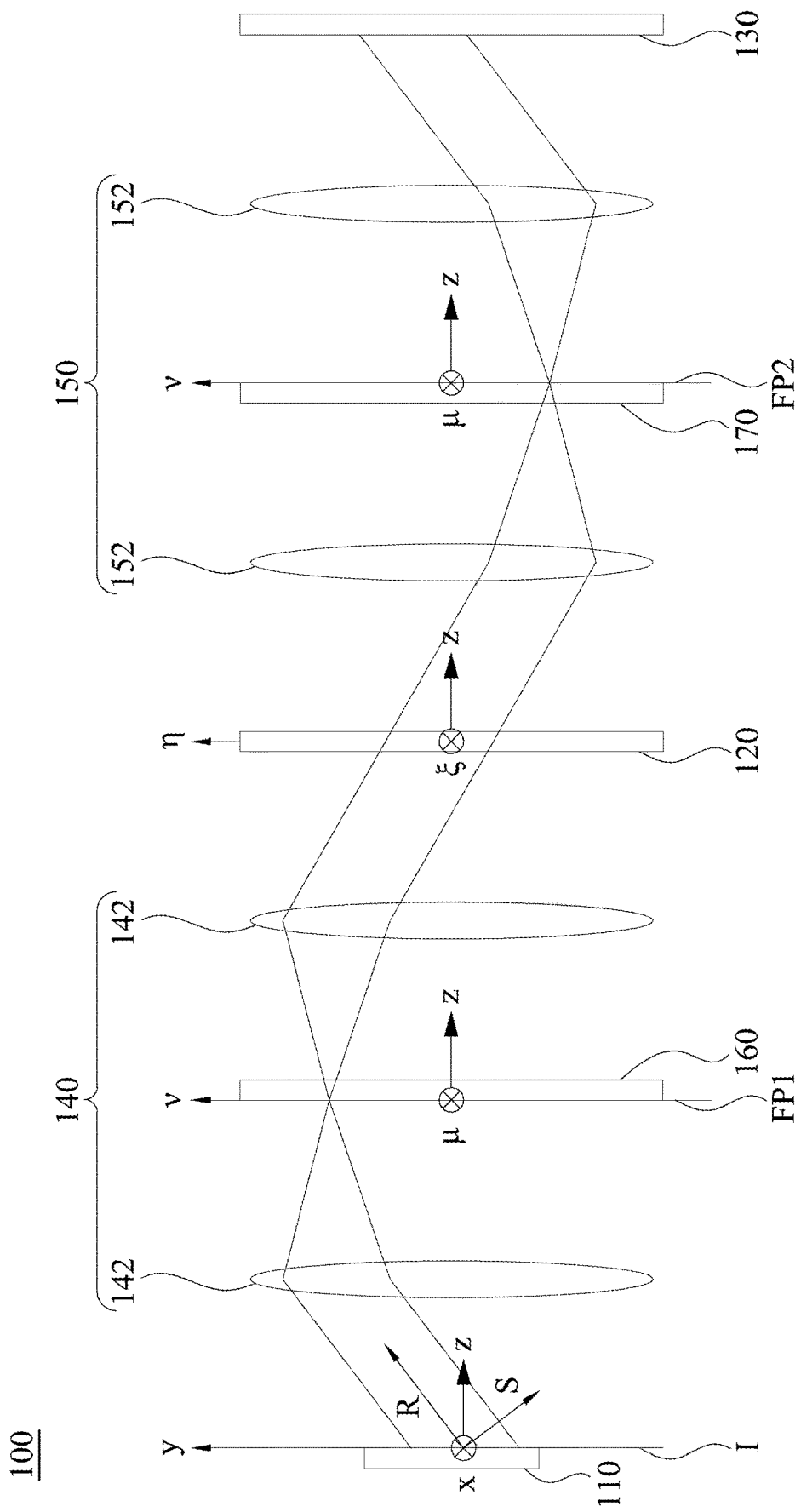
FIG. 1 is a schematic view of a holographic storage system in writing state according to one embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the drawings. The spatially relative terms are intended to encompass different orientations of the device in use or operation in addition to the orientation depicted in the drawings. The apparatus may be otherwise oriented (rotated 90 degrees or at other orientations) and the spatially relative descriptors used herein may likewise be interpreted accordingly.

Figure 2:
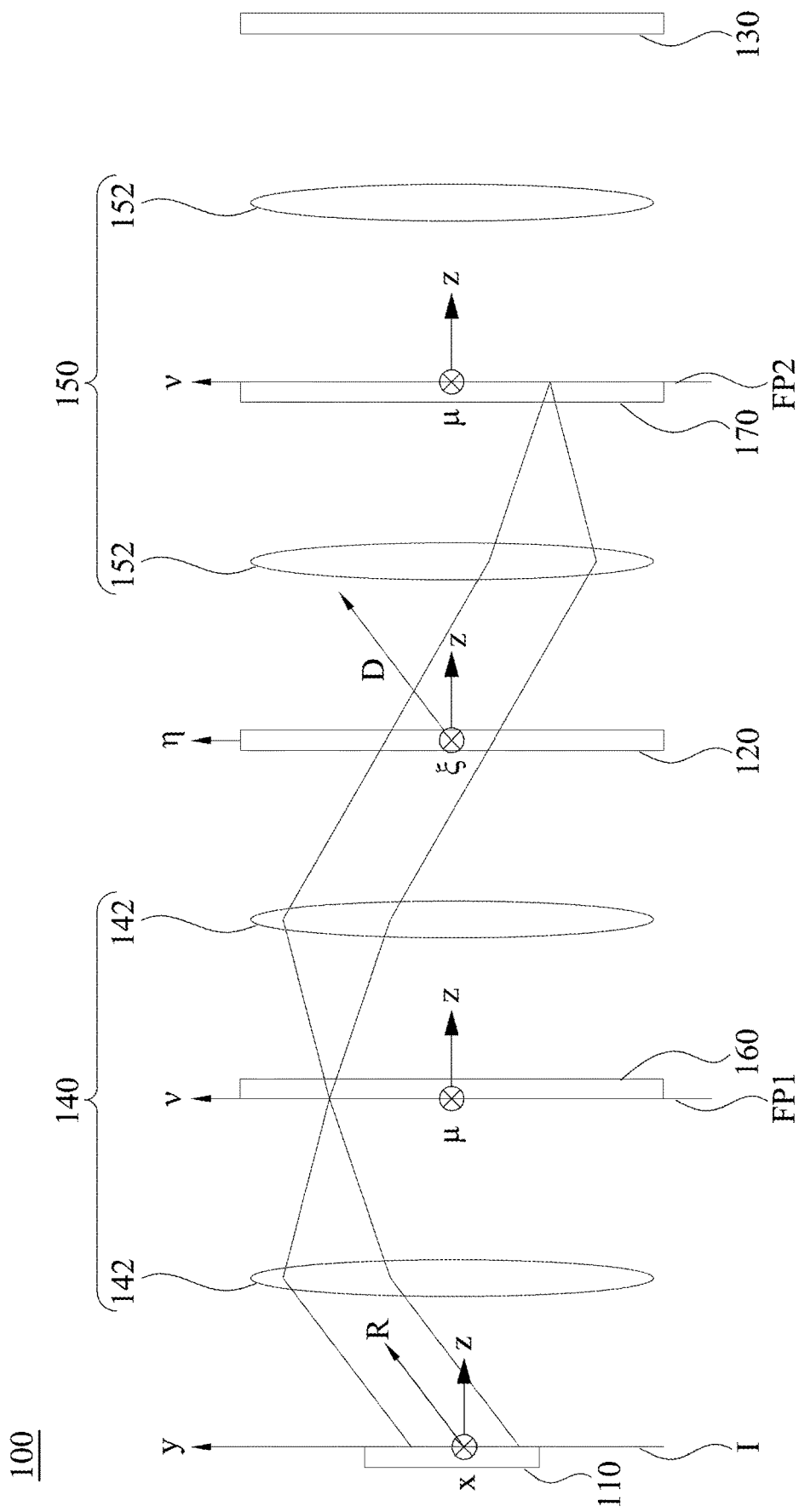
FIG. 2 is a schematic view of the holographic storage system of FIG. 1 in reading state.

FIG. 1 is a schematic view of a holographic storage system 100 in writing state according to one embodiment of the present disclosure. FIG. 2 is a schematic view of the holographic storage system 100 of FIG. 1 in reading state. Refer to FIG. 1 and FIG. 2, a method for reading and writing with holographic storage system 100 includes the following steps: (a) providing a reference light R and a signal light S; (b) propagating the reference light R and the signal light S to an optical storage medium 120 to record an interference grating; (c) changing the reference light R and the signal light S and repeating the step of providing another changed reference light R and another changed signal light S to step (b), in which the reference lights R and the interference gratings are one-to-one correspondence; (d) repeating steps (a) to (c) to obtain a plurality of the reference lights R and a plurality of the interference gratings; (e) providing a reading light that includes the reference lights R to the optical storage medium 120 to simultaneously read the interference gratings to form an interference result D, in which the interference result D is the interference of a plurality of diffraction signals of the interference gratings respectively, any one of the reference lights R cannot read out the interference gratings recorded by the other reference lights R; and (f) moving the optical storage medium 120 and repeating step (e) to obtain a plurality of the interference results D and a plurality of the reading lights. In addition, before repeating the steps (a) to (c), the optical storage medium is moved.

In some embodiments, the method for reading and writing with holographic storage system 100 can includes other steps between two steps of the steps (a) to (f), before step (a), or after step (f). In addition, each of the steps (a) to (e) can also include multiple detailed steps. In the following description, at least step (a) to step (f) described above are described.

Figure 3A:
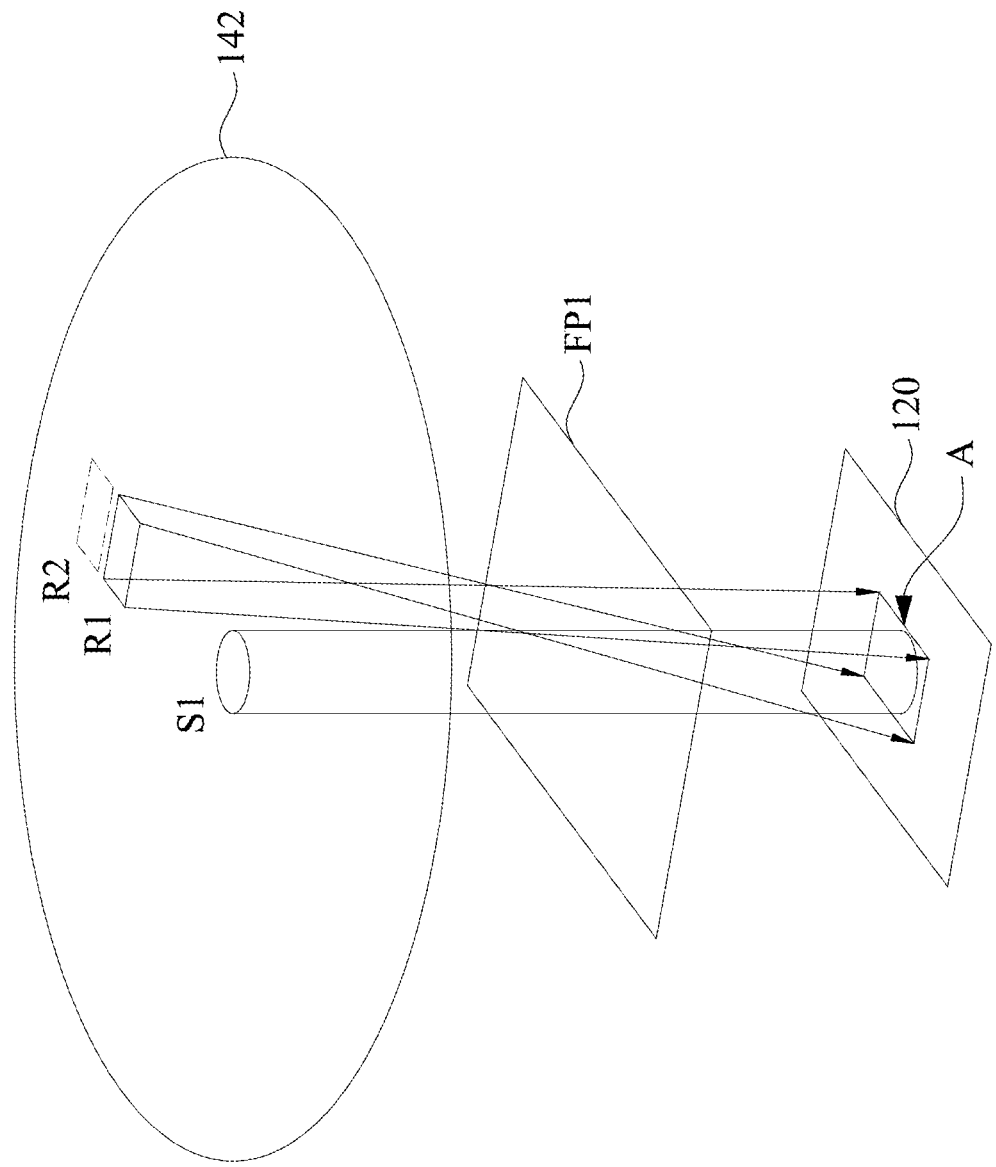
FIG. 3A and FIG. 3B are schematic views of the holographic storage system of FIG. 1 providing different set of reference light and signal light in writing state.
Figure 3A:
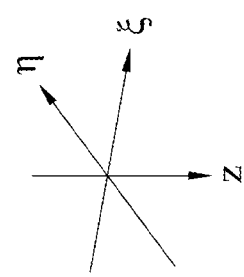
Figure 3B:
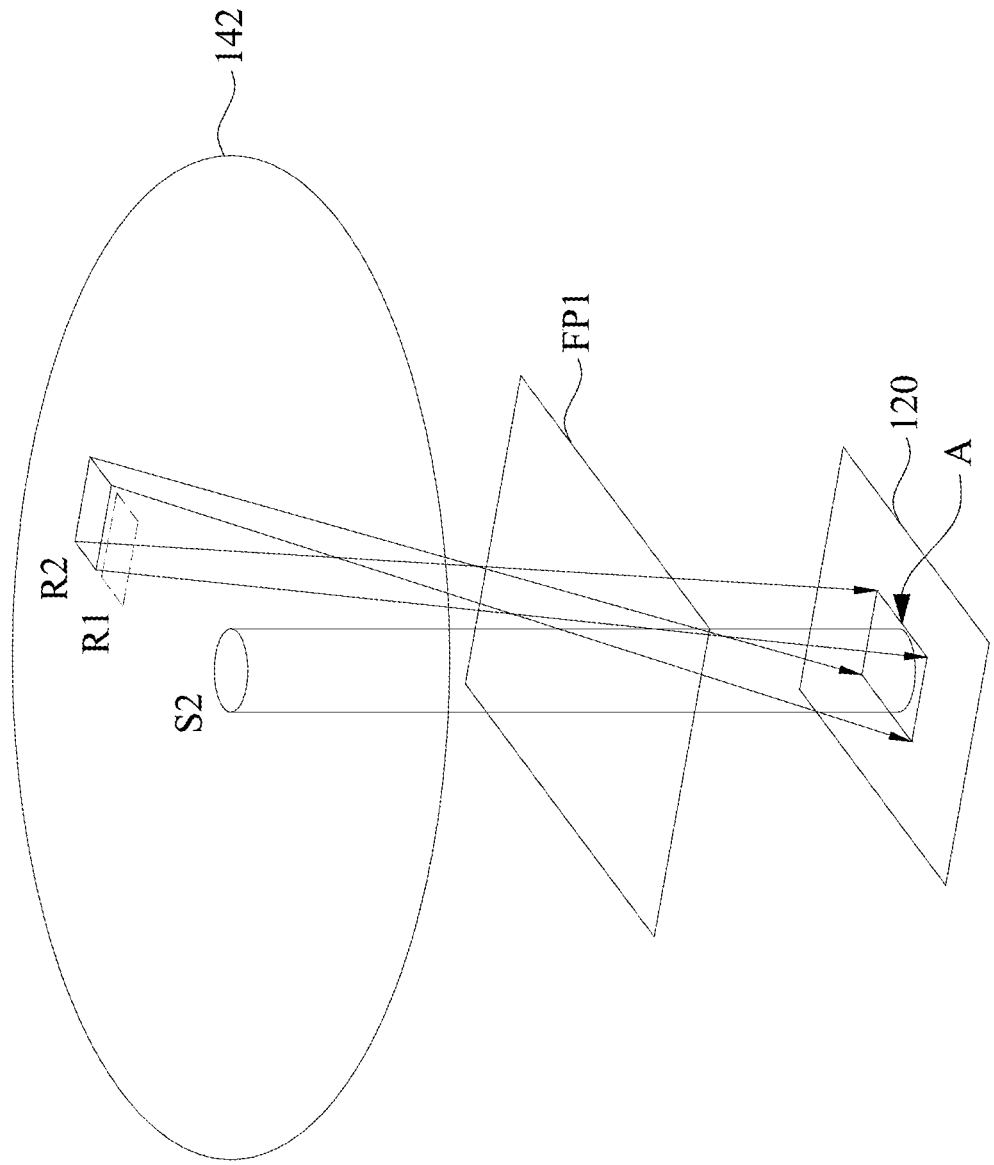
Figure 3B:
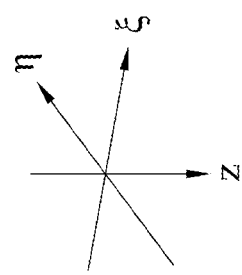

FIG. 3A and FIG. 3B are schematic views of the holographic storage system 100 of FIG. 1 providing different set of reference light R1, R2 and signal light S1, S2 in writing state. Refer to FIG. 3A, in writing state of step (a) to (c), the signal light S1 and the reference light R1 will irradiate the optical storage medium 120 simultaneously, and record an interference grating at the position A of the optical storage medium 120. The interference grating can only be read by the reference light R1. Thereafter, refer to FIG. 3B, when providing another reference light R2 and another signal light S2, the incident angle of the reference light R2 will change compared to the reference light R1, which means that multiple reference lights will irradiate with different incident angle on the η direction, and record the corresponding interference grating with each of the reference lights at the same position A. When changing the reference light R1 and the signal light S1 and repeating the step of providing another changed reference light R2 and another changed signal light S2 to step (b) is performing, the optical storage medium 120 remains static. After all the interference gratings correspond to each of the reference lights are recorded, the optical storage medium 120 will move along the ξ direction in order to continue recording the data. The displacement vector ξ of the optical storage medium 120 and is along the Bragg-degeneracy direction of a wave vector of the interference grating, which means that the displacement vector ξ of the optical storage medium 120 (i.e. the reading direction of the reading state) is the Bragg degeneracy direction to let the diffraction light maintains the greatest efficiency of diffraction. In FIG. 3A and FIG. 3B, only two reference lights R1, R2 and two signal lights S1, S2 are shown, but in real applications, the amount of the reference lights are not limited thereto. For example, n reference lights R1, R2, R3 . . . Rn can be provided with different incident angle. In the present embodiment, the reference lights R are a plurality of cylindrical waves, the cylindrical waves are provided by the spatial light modulator 110 (see FIG. 1), and a waveform of the cylindrical waves along a displacement vector ξ of the optical storage medium 120 is a spherical wave. Moreover, a waveform of the reference lights R along a direction η perpendicular to a displacement vector ξ of the optical storage medium 120 is an inclined plane wave.

Refer to FIG. 2, FIG. 3A and FIG. 3B, when in reading state of step (d) to (f), a reading light includes all the reference lights R (e.g. the reference light R1 of FIG. 3A and the reference light R2 of FIG. 3B) will simultaneously irradiate the optical storage medium 120, and since any one of the reference lights R(such as reference light R1) cannot read out the interference gratings recorded by the other reference lights R(such as reference light R2), the diffraction signal of the interference grating corresponds to the reference light R1 will be detected by the image sensor 130. Moreover, since a destructive interference will occur when the reference light R1 irradiate the interference gratings corresponds to other reference light (such as reference light R2), the diffraction signal of the interference gratings corresponds to other reference lights (such as reference light R2) will not be read out finally. Similarly, the diffraction signal of the interference grating corresponds to the reference light R2 will be read out in the same way without reading out the diffraction signal of the interference grating corresponds to the reference light (such as reference light R1). Finally, multiple diffraction signal read out will interfere with each other and form the interference results D.

In particular, when recording the interference gratings, the desired data result is approximated by setting the phase or the weighting factor of the diffraction signals. The phases or the weighting factors of the diffraction signals when the diffraction signals interfere with each other is determined by phases or amplitudes of providing the signal lights S. Therefore, define a one-dimensional space $E(\xi_s)$, of which the independent parameter is the displacement $\xi_s$ between each of the signal lights and each of the reading lights. Then, introduce the reading-writing phase difference $\omega_j(\xi_s)$ between each of the reading lights and the corresponding reference lights. The reading-writing phase differences $\omega_j(\xi_s)$ defines a plurality of bases $e^{i\omega_j(\xi_s)}$, the bases are then superimposed obtain a distribution function $E(\xi_s)$, which means:

$$E(\xi_s) = \sum_{j=1}^{M} C_j(\xi_s)e^{i\omega_j(\xi_s)} \qquad \text{Eq. 1}$$

The distribution function is the variation of the light field, in which j is a spatial parameter. The physical meaning of Eq. 1 is that when the spatial parameter is equal to j, there is a reading-writing phase difference $\omega_j(\xi_s)$, the output $E(\xi_s)$ is the superposition of the signals that are respectively read from writing signals $C_j(\xi_s)$. $C_j(\xi_s)$ is the weighting factor mentioned above. When adjusting the weighting factor $C_j(\xi_s)$ of the bases, it can be done through adjusting the phase $\Phi_j$, the amplitude $A_j$, or both. Here, in general:

$$C_j(\xi_s)=A_j e^{i\Phi_j} \qquad \text{Eq. 2}$$

In real applications, the method of setting the weighting factor is to measure, by a photoelectric detector, the absolute squared value of the distribution function $|E(\xi_s)|^2$ (corresponds to the measured energy variation of the electromagnetic field), and set phases or weighting factors of the diffraction signals when interfering with each other by comparing the absolute squared value of the distribution function and the desired data result.

Since when writing, each of the reference lights R and the interference grating correspond to the reference light R are one-to-one correspondences, any one of the reference lights cannot read out the interference gratings recorded by the other reference lights. Therefore, when reading, a reading light including multiple reference lights R can be simultaneously irradiate, such that the diffraction signals of all the interference gratings can be read out at the same time and interfere with each other. Thereafter, the original information can be obtained through calculation and weighting. As a result, since the signals of every page interfere with each other, the efficiency of diffraction will significantly increase. For example, for a holographic storage system with 300 pages, since the signals of all 300 pages are read out, the efficiency of diffraction is 300 times of the conventional method.

Refer to FIG. 1, the holographic storage system 100 further includes a spatial light modulator 110, an image sensor 130, a first lens group 140 and a second lens group 150. The spatial light modulator 110 is configured to modulate a plurality of reference lights R and a plurality of signal lights S. In the present embodiment, the relationship between the spatial light modulator 110 and the optical storage medium 120 is an object-image relationship, which means that there is a four times focal length (4f) system between the spatial light modulator 110 and the optical storage medium 120 (the focal length is the focal length of one of the lens 142 of the first lens group 140. When the reference light R pass through the lens 142, it will focus on the Fourier plane FP1, in which the distance between the Fourier plane FP1 and the lens 142 is the focal length). In other embodiments, however, the spatial light modulator 110 can be positioned out of the input plane I. The relationship between the input plane I and the spatial light modulator 110 can be an object-image relationship. The reference light R and the signal light S intersect with each other on the input plane I. In the present embodiment, the reference light R is provided by the spatial light modulator 110. In other embodiments, however, the reference light can be modulated in other optical path, and then guided into the optical path of the holographic storage system 100 by a beam splitter located between the input plane I and the optical storage medium 120. Or else, in other embodiments, a diffraction optical element can be used to provide the reference light, if only the electric field distribution of the reference light of these embodiments is equivalent to the electric field distribution of the reference light of the embodiment in FIG. 1, a same effect can be achieved.

The image sensor 130 is located at a side of the optical storage medium 120 facing away the spatial light modulator 110, configured to receive a plurality of interference results D of the interference gratings in a reading mode. The first lens group 140 is located between the spatial light modulator 110 and the optical storage medium 120. The second lens group 150 is located between the optical storage medium 120 and the image sensor 130. In the present implementation, the first lens group 140 includes at least two lenses 142, and the second lens group 150 includes at least two lenses 152. In the present embodiment, the relationship between the optical storage medium 120 and the image sensor 130 is an object-image relationship, which means that there is a four times focal length (4f) system between the optical storage medium 120 and the image sensor 130 (the focal length is the focal length of one of the lens 152 of the second lens group 150).

Figure 4:
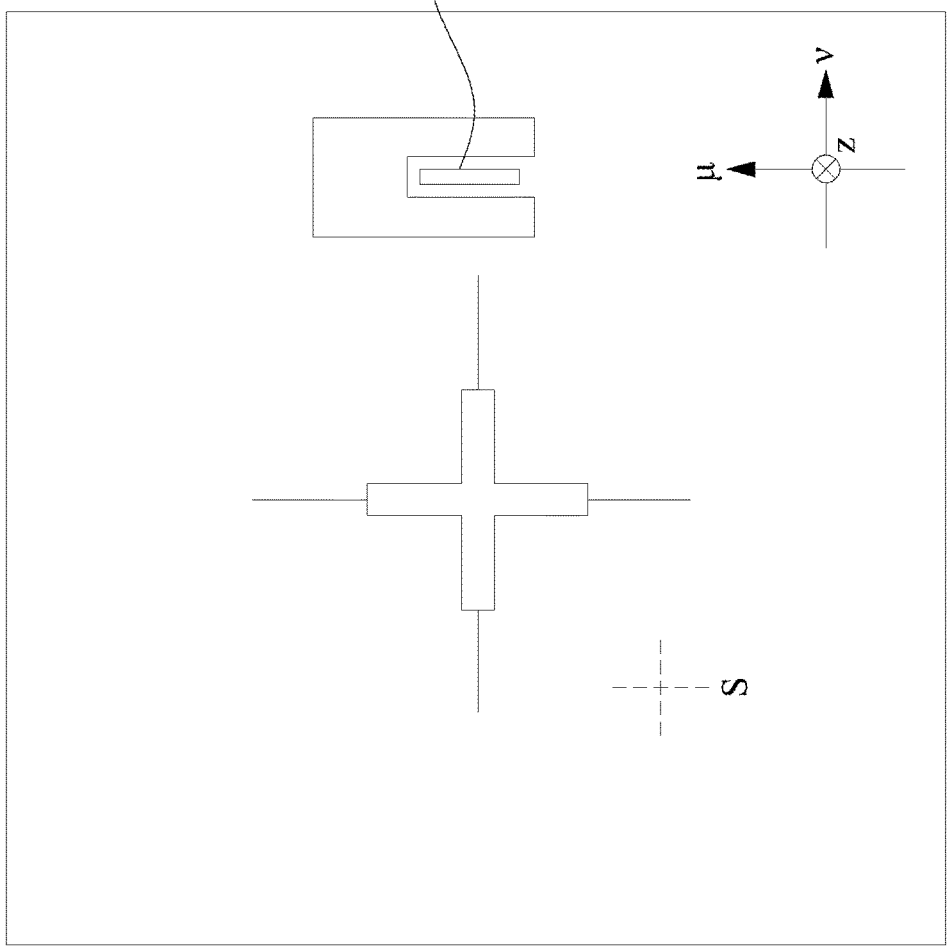
FIG. 4 is a schematic view of the first shielding plate of FIG. 1.

FIG. 4 is a schematic view of the first shielding plate 160 of FIG. 1. Refer to FIG. 1 and FIG. 4, the holographic storage system 100 further includes a first shielding plate 160. The first shielding plate 160 is located between the two lenses 142 of the first lens group 140. The first shielding plate 160 is configured to filter the noise of the signal lights S. The noise needs to be filtered is mainly the direct current (DC) term of the light diffracted by the SLM. When the reading light irradiate the optical storage medium 120, the diffraction result of multiple interference gratings will be read out, a portion of the reading light, however, will pass through the optical storage medium 120.

Figure 5:
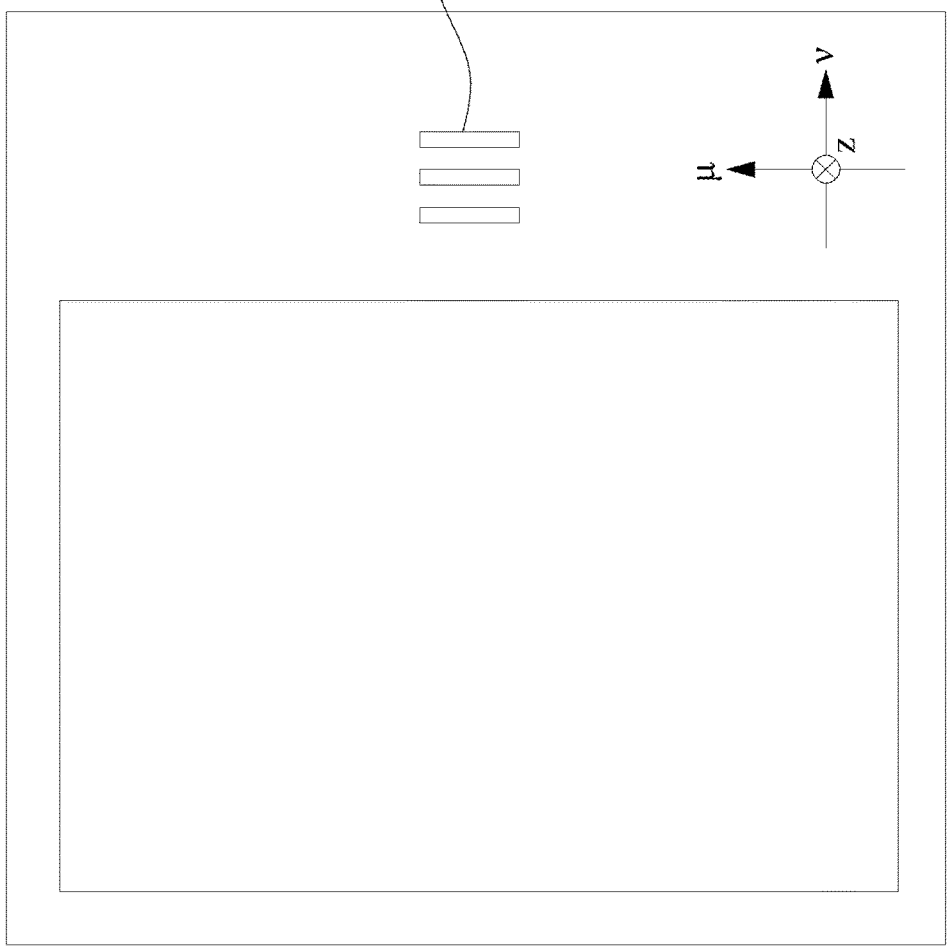
FIG. 5 is a schematic view of the second shielding plate of FIG. 1.

FIG. 5 is a schematic view of the second shielding plate of FIG. 1. Refer to FIG. 1 and FIG. 5, the holographic storage system 100 further includes a second shielding plate 170. The second shielding plate 170 is located between the two lenses 152 of the second lens group 150. The second shielding plate 170 is configured to block a reading light penetrating the optical storage medium 120, such that the reading light won't propagate to the image sensor 130.

When the $j^{th}$ page of the interference gratings is read out, a spherical wave basis will be diffracted out, such spherical wave basis is the $e^{i\omega_j(\xi_s)}$ mentioned above. Eq. 1 means that the output signal is the superposition of weighted spherical wave bases, in which assume that $C_j(\xi_s)$ has the form of Eq. 2. If there is a phase difference between the reading-writing phase difference $\omega_j(\xi_s)$ and the spherical wave front read out, the difference can be compensated by the $e^{i\Phi_j}$ term of the $C_j(\xi_s)$. In real calculations, when compensating the phase, the compensated phase $\omega_j$ can be a value that is only relevant to the spatial parameter of the $j^{th}$ signal light on the input plane I. In this case, $\Phi_j$ is:

$$\Phi_j(x, y) = GS_j(x, y) + \psi_j, \psi_j = k_r \frac{x_j}{2z_r} \qquad \text{Eq. 3}$$

In which $k_r$, $z_r$ are constants, $x_j$ is the position on the x direction of the $j^{th}$ signal light on the input plane I. $GS_j(x, y)$ is the phase of the bases calculated under each (x, y) channel when the $j^{th}$ interference gratings is recorded. If we consider the weighting factor of the $j^{th}$ basis under each (x, y) channel alternatively, Eq. 3 can be rewritten into:

$$\Phi_{x,y}(j)=GS_{x,y}(j)+\omega(j) \qquad \text{Eq. 4}$$

$GS_{x,y}(j)$ is a phase modulation value that stored in the database in advance, which can be calculated using optimization algorithms such like Gerchberg-Saxton algorithm (GS algorithm), adaptive-additive algorithm (AA algorithm), Genetic algorithm, Annealing algorithm or deep learning.

Figure 6:
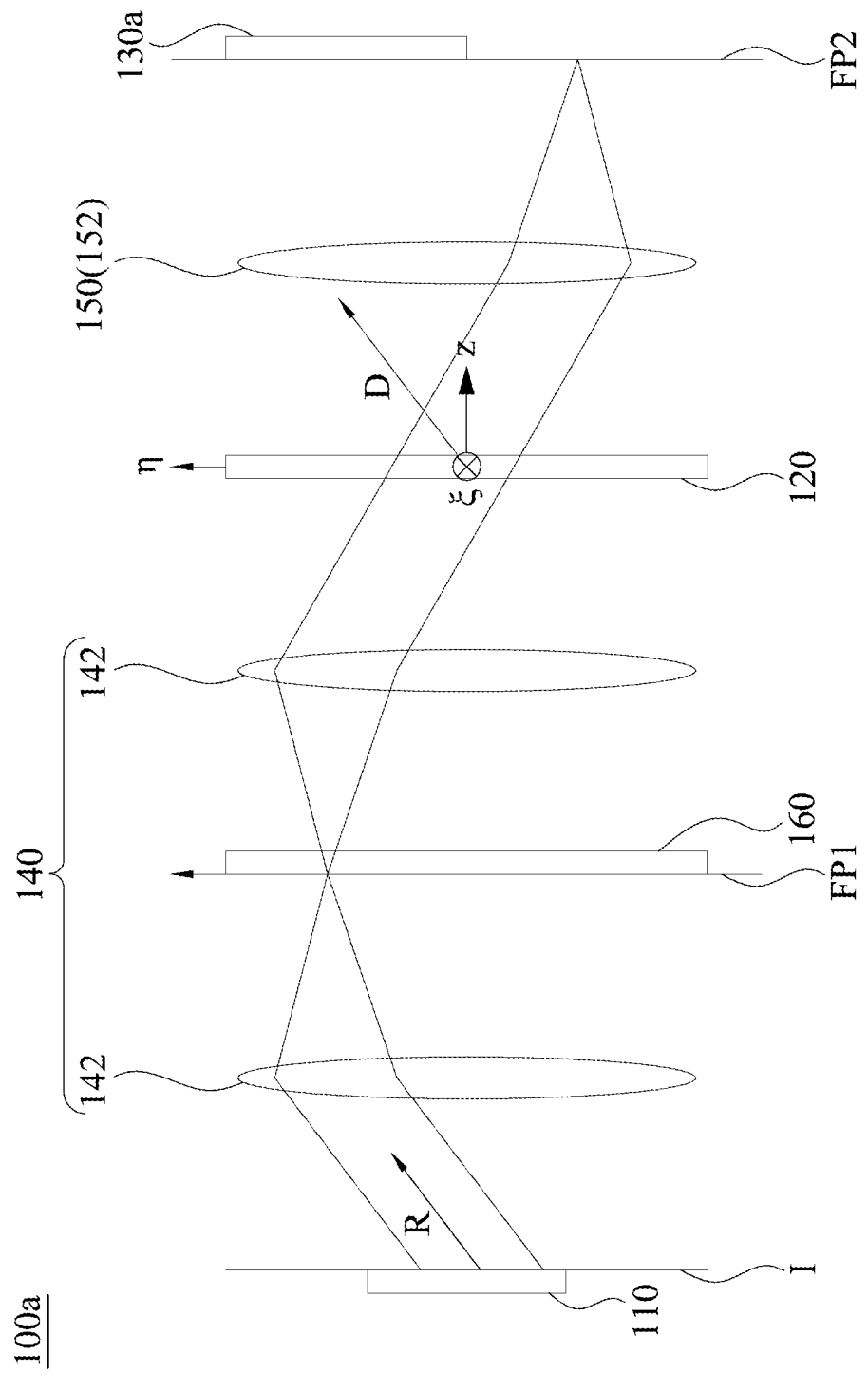
FIG. 6 is a schematic view of a holographic storage system in reading state according to another embodiment of the present disclosure.

FIG. 6 is a schematic view of a holographic storage system 100a in reading state according to another embodiment of the present disclosure. The holographic storage system 100a includes a spatial light modulator 110, an optical storage medium 120, an image sensor 130a, a first lens group 140, a second lens group 150 and a first shielding plate 160. The difference between the present embodiment and the embodiment in FIG. 1 is that the relationship between the optical storage medium 120 and the image sensor 130a is a Fourier transform relationship, which means that the image sensor 130a is located on the Fourier plane FP2. Since the position of the image sensor 130a is changed, the reading light pass through the optical storage medium 120 will not be received by the image sensor 130a. Moreover, the holographic storage system 100a doesn't have the second shielding plate 170 of FIG. 2, and the second lens group 150 has only a single lens 152.

Refer to FIG. 1, in this embodiment, since the image sensor 130 is positioned on the image conjugate plane of the input plane I, the output signal is the image of the input signal. In this case, assuming that $I_{x,y}(p)$ is the $p^{th}$ read out value of the (x,y) channel, a signal transform equation exists as below:

$$S_{x,y}(j)=H_{x,y}I_{x,y}^T(p) \qquad \text{Eq. 5}$$

Refer to FIG. 6 in this embodiment, since the image sensor 130 is positioned on the Fourier plane of the input plane I, the output signal is the Fourier space of the input signal. In this case, assuming that $I_{\mu,\nu}(p)$ is the $p^{th}$ read out value of the ($\mu$, $\nu$) channel, a signal transform equation exists as below:

$$\delta_{\mu,\nu}(j)=H_{\mu,\nu}I_{\mu,\nu}^T(p) \qquad \text{Eq. 6}$$

It can be observed that the mathematical form of the signal transform equations between the input signal and the output signal of the two embodiments are the same. If we use r1, r2 to uniformly represents a specific spatial parameter, Eq. 5 and Eq. 6 can both be expressed as:

$$S_{r1,r2}(j)=H_{r1,r2}I_{r1,r2}^T(p) \qquad \text{Eq. 7}$$

In which $S_{r1,r2}(j)$ is the input electric field modulation, as indicated above, this modulation can be a pure phase modulation $S_{r1,r2}(j)=e^{i\Phi_{r1,r2}(j)}$, a pure amplitude modulation $S_{r1,r2}(j)=A_{r1,r2}(j)$, or both $S_{r1,r2}(j)=A_{r1,r2}(j)e^{i\Phi_{r1,r2}(j)}$. The superscript "$T$" means matrix transpose. $H_{r1,r2}$ is the signal transformation matrix, which can be obtained with deep learning method under a sufficiently large database to approximate the $E(\xi_s)$. A relationship between p and $\xi_s$ is indicated as $\xi_s = p\Delta\xi_s$, in which $\Delta\xi_s$ is the displacement per step of the optical storage medium 120 on the $\xi_s$ direction every time when reading. r1, r2 is a kind of two-dimension coordinate, such as a spatial coordinate or a Fourier-transformed coordinate. If the input electric field modulation is modulated through the spatial light modulator 110 (See FIG. 1), the input electric field modulation $S_{r1,r2}(j)$ needs to be calculated using the signal transformation matrix $H_{r1,r2}$, then obtained an input electric field modulation function $S_j(r1, r2)$ of the $j^{th}$ writing state (i.e. use the $j^{th}$ signal light S and the $j^{th}$ reference light R to write), and then written into the optical storage medium 120 through the holographic storage system 100, 100a.

In some embodiments, the signal lights S and the reference light R may not be produced by the same spatial light modulator 110, multiple spatial light modulator can be used to produce the plane wave for each of the position respectively. However, the method will cause that not all reference lights R with different incident angle overlap with each other on the optical storage medium 120, which cannot ensure the minimum storage space and the maximum storage density. Therefore, in the present embodiment, the position of the input plane I is adjusted, such that the input plane is located at the defocal plane of the input plane I of FIG. 1, at the defocal plane of the Fourier plane FP1 or at the defocal plane of the optical storage medium 120. The three method mentioned above is equivalent to a wavelet transform of each of the reference light, which shift or rescale the reference lights signals from each of the spatial light modulators to achieve a same effect as the embodiment of FIG. 1.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method for reading and writing with holographic storage system, comprising the following steps:
   (a) providing a reference light and a signal light;
   (b) propagating the reference light and the signal light to an optical storage medium to record an interference grating;
   (c) changing the reference light and the signal light and repeating the step of providing another changed reference light and another changed signal light to step (b), wherein the reference lights and the interference gratings are one-to-one correspondence;
   (d) repeating steps (a) to (c) to obtain a plurality of the reference lights and a plurality of the interference gratings;
   (e) providing a reading light that comprises the reference lights to the optical storage medium to simultaneously read the interference gratings to form an interference result, wherein the interference result is the interference of a plurality of diffraction signals of the interference gratings respectively, any one of the reference lights cannot read out the interference gratings recorded by the other reference lights; and
   (f) moving the optical storage medium and repeating step (e) to obtain a plurality of the interference results and a plurality of the reading lights.

2. The method for reading and writing with holographic storage system of claim 1, wherein before repeating the steps (a) to (c), the optical storage medium is moved.

3. The method for reading and writing with holographic storage system of claim 1, wherein the interference results change along with moving of the optical storage medium.

4. The method for reading and writing with holographic storage system of claim 1, wherein phases or weighting factors of the diffraction signals when the diffraction signals interfere with each other is determined by phases or amplitudes of providing the signal lights.

5. The method for reading and writing with holographic storage system of claim 1, wherein a displacement between each of the signal lights and each of the reading lights is defined to be $\xi_s$, a reading-writing phase difference $\omega_j(\xi_s)$ is between each of the reading lights and one of the reference light, the reading-writing phase differences $\omega_j(\xi_s)$ defines a plurality of bases $e^{i\omega_j(\xi_s)}$ the bases are superimposed and adjust a weighting factor of the bases to obtain a distribution function $E(\xi_s)$, an absolute squared value of the distribution function $|E(\xi_s)|^2$ is measured by a photoelectric detector, and the phases or weighting factors of the diffraction signals when interfering with each other are set according to the desired absolute squared value of the distribution function.

6. The method for reading and writing with holographic storage system of claim 1, wherein the reference lights and the signal lights are provided by a spatial light modulator, and the spatial light modulator and the optical storage medium is an object-image relationship.

7. The method for reading and writing with holographic storage system of claim 6, wherein the reference lights are a plurality of cylindrical waves, the cylindrical waves are provided by the spatial light modulator, and a waveform of the cylindrical waves along a displacement vector of the optical storage medium is a spherical wave.

8. The method for reading and writing with holographic storage system of claim 1, wherein a displacement vector of the optical storage medium is along the Bragg-degeneracy direction of a wave vector of the interference grating.

9. The method for reading and writing with holographic storage system of claim 1, wherein a waveform of the reference lights along a direction perpendicular to a displacement vector of the optical storage medium is an inclined plane wave.

10. The method for reading and writing with holographic storage system of claim 1, further comprising:
   using the interference results $I_{r1,r2}^T(p)$ and a signal transformation matrix $H_{r1,r2}$ to calculate a modulation $S_{r1,r2}(j)$ of a spatial light modulator when using the spatial light modulator to modulate a $j^{th}$ interference grating of the M interference gratings under a specific spatial parameter, wherein a calculation formula is indicated as below:

$$S_{r1,r2}(j)=H_{r1,r2}I_{r1,r2}^T(p).$$

11. The method for reading and writing with holographic storage system of claim 1, wherein when changing the reference light and the signal light and repeating the step of providing another changed reference light and another changed signal light to step (b) is performing, the optical storage medium remains static.

12. A holographic storage system, comprising:
- a spatial light modulator, configured to modulate a plurality of reference lights and a plurality of signal lights;
- an optical storage medium located at a side of the spatial light modulator, configured to store a plurality of interference gratings by the reference lights and the signal lights in a writing mode, wherein the reference lights and the interference gratings are one-to-one correspondence, and any one of the reference lights cannot read out the interference gratings recorded by the other reference lights;
- an image sensor located at a side of the optical storage medium facing away the spatial light modulator, configured to receive a plurality of interference results of the interference gratings in a reading mode;
- a first lens group located between the spatial light modulator and the optical storage medium; and
- a second lens group located between the optical storage medium and the image sensor.

13. The holographic storage system of claim 12, wherein in the reading mode, a plurality of the reference light is used to read a plurality of the interference grating.

14. The holographic storage system of claim 12, wherein the first lens group comprises at least two lenses, and the second lens group comprises at least two lenses.

15. The holographic storage system of claim 14, further comprising:
- a first shielding plate located between the two lenses of the first lens group, configured to filter a noise of the signal lights; and
- a second shielding plate located between the two lenses of the second lens group, configured to block a reading light penetrating the optical storage medium.

16. The holographic storage system of claim 12, wherein a relationship between the optical storage medium and the image sensor is an object-image relationship.

17. The holographic storage system of claim 12, wherein a relationship between the optical storage medium and the image sensor is a Fourier transform relationship.

* * * * *